United States Patent [19]

Köcher

[11] 4,305,988
[45] Dec. 15, 1981

[54] COMPOSITE MATERIAL COMPRISING ULTRASONICALLY WELDED SEAMS WHICH COMBINE STRANDS, METHOD FOR ITS MANUFACTURE, AND APPARATUS FOR THE CARRYING OUT OF THE METHOD

[76] Inventor: Walter Köcher, Mozartstrasse 11, 8671 Selbitz, Fed. Rep. of Germany

[21] Appl. No.: 105,295

[22] Filed: Dec. 19, 1979

[30] Foreign Application Priority Data

Mar. 29, 1979 [DE] Fed. Rep. of Germany ... 7909013[U]
Jul. 18, 1979 [DE] Fed. Rep. of Germany ....... 2928941

[51] Int. Cl.³ .................. B06B 3/00; B29C 27/08; B32B 3/22; B32B 31/21; B65B 11/00
[52] U.S. Cl. .................................... 428/158; 156/70; 156/73.1; 156/73.5; 156/383; 156/580.1; 428/162; 428/163; 428/167; 428/173; 428/178; 428/188; 428/195
[58] Field of Search .............. 156/70, 73.1, 73.5, 156/383, 580.1; 428/158, 162, 163, 173, 178, 188, 167, 195

[56] References Cited

U.S. PATENT DOCUMENTS

| | | | |
|---|---|---|---|
| 1,470,465 | 10/1923 | Marquette | 428/163 |
| 3,075,862 | 1/1963 | Hoyer | 428/163 |
| 3,418,196 | 12/1968 | Lue | 156/73.1 |
| 3,517,805 | 6/1970 | Gould | 428/188 |
| 3,733,238 | 5/1973 | Long et al. | 156/580.1 |
| 3,833,439 | 9/1974 | Smith | 428/163 |
| 3,844,876 | 10/1974 | Wilson et al. | 428/163 |
| 3,879,256 | 4/1975 | Rust | 156/73.1 |
| 4,079,568 | 3/1978 | Wortman | 428/29 |

FOREIGN PATENT DOCUMENTS

1366481 9/1974 United Kingdom ............... 428/294

Primary Examiner—James C. Cannon
Attorney, Agent, or Firm—Fred A. Keire

[57] ABSTRACT

Improved multi-layered articles ultrasonically joined having at least one interior material non-ultrasonically joinable and method and apparatus for producing said articles.

12 Claims, 3 Drawing Figures

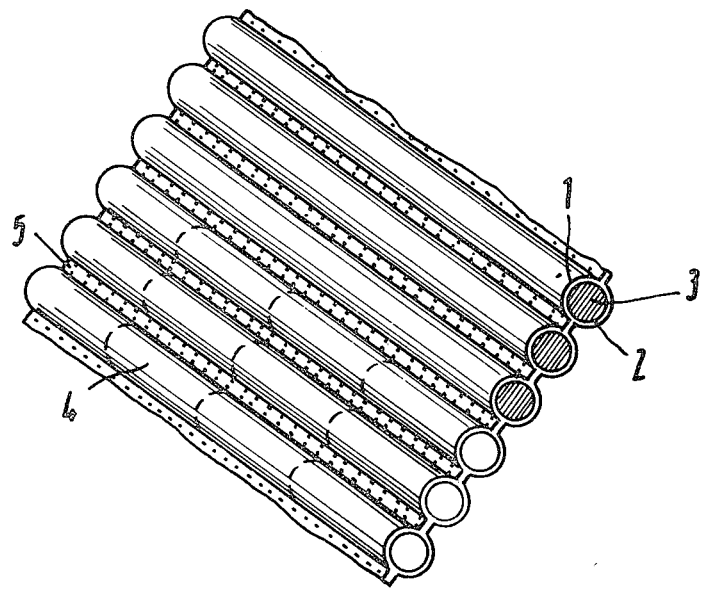

COMPOSITE MATERIAL COMPRISING ULTRASONICALLY WELDED SEAMS WHICH COMBINE STRANDS, METHOD FOR ITS MANUFACTURE, AND APPARATUS FOR THE CARRYING OUT OF THE METHOD

Three-layer and multilayer composite materials are already known in which the joining of layers is generally effected by stitching, bonding, flame-bonding or high frequency welding. One great disadvantage of stiching is that holes are made in the materials. Disadvantages of bonding are that evaporation of a solvent requires application of heat. Furthermore, in the case of flame-bonding of a foam, the foam must be heated to above its melting point, which requires a considerable amount of heat and causes dangerous gases to be produced. These gases must be eliminated according to the laws governing the protection of the environment; this elimination can be done only at great expense. High-frequency welding can, as a rule, be effected only discontinuously. One serious disadvantage of the high-frequency method is that only a few materials can be welded together, namely ones which have a suitable dielectric loss angle tan δ (for instance, non-rigid PVC tan δ equal to about 0.1 at $10^6$ $H_z$ in contradistinction for instance to polyethylene tan δ equal to about 0.0005, which cannot be welded by high frequency). Plastic-coated metals can also not be welded by high frequency.

Furthermore, it is known how to produce composite materials from an upper layer, a lower layer, and a non-woven web as intermediate layer by ultrasonic spot welding. A prerequisite for the manufacture of such composite materials is however that the materials of all three layers have the same or similar vibration properties so that these can be welded by ultrasonic sound. In practice, this requirement greatly limits the opportunity to use this method. For example, it is not possible with this method to connect two outer layers, capable of oscillation, of synthetic textile materials with intermediate layers of a plastic foam, such as polyurethane, polyethylene, synthetic rubber or non-woven webs of wool, cotton, cellulose derivatives, materials which have been impregnated or provided with a water-resistant finish, metals, paper, or the like.

Another disadvantage of the said composite materials having intermediate layers of non-woven webs is that such composite materials can have only a slight elasticity since non-woven materials are, as a rule, inelastic or only slightly elastic.

The object forming the basis of the invention was thus to obtain, in the least expensive and simplest manner possible, composite materials in which any desired materials can be incorporated as intermediate layer without it being necessary to make holes in the outer layers as in the case of stitching, and without having to use external heating for the welding. One specific purpose of the invention is to obtain composite materials of this type which are of increased elasticity.

The composite materials of the invention which have an upper layer, a lower layer bonded to it by ultrasonic welding seams, and an intermediate layer are characterized by the fact that the upper layer and the lower layer are directly welded together along substantially parallel ultrasonic weld seams which are spaced apart from each other, and that the intermediate layer has the shape of individual strands of material which lie substantially parallel to the weld seams between the latter in the channels formed by the upper and lower layers.

These composite materials have the advantage that these can contain, as an intermdiate layer, any desired material, depending on the intended purpose of use. The materials for the intermediate layer can be capable of being welded by ultrasonics but need not be, since the necessary weld seams primarily merely connect the upper layer to the lower layer. Thus, depending on the purpose of use, any desired materials in strand shape can be inserted into the channels between the upper layer and the lower layer and the weld connections, and in this way the physical, chemical or thermal properties of the composite material can be varied as desired.

For example, strands of material formed from polyurethane, polyethylene, synthetic rubber or non-rigid polyvinyl chloride, non-wovens of polyester, polyamide, silicon-treated fibers, wool, cotton, cellulose derivatives, non-rigid or rigid plastic foils in the form of strips or shapes, rubber strips or rubber bands, strands of paper, metal in the form of strips, spiral springs, wire windings, rods or wires can be incorporated. When reference is had here to strands of material there are meant thereby shaped bodies whose length is greater than their width or thickness. It is intended herein that shaped members of any desired configuration, strips, bands, tubes, spiral windings or similar structures may be utilized.

It is particularly suitable if the strands of material consist of a material which is not capable of ultrasonic welding since these then cannot adhere along the weld seams to the upper layer and/or the lower layer, but lie free and movable within the channels, which increases the elasticity of the composite material.

For many purposes, it is in particular preferred for the strands of material to consist of a foam since a foam is heat-insulating and contains a relatively large amount of air so that such composite materials can be used for instance for water-sports clothing since these composite materials are heat insulating, shock-dampening and water tight and at the same time serve as floating aids.

When reference is made to weld seams, it is intended, as customary in ultrasonic welding, that spot weldings which are so arranged however in lines in accordance with the invention that the overall effect is similar to a corresponding weld seam.

Very different materials can also be used for the upper and lower layers. It is preferred for at least one of the outer layers, namely, the upper layer or the lower layer, to consist of an elastic material. For purposes of clothing, it is of course desirable for both outer layers to be elastic materials, in which connection these may consist of sheets, possibly plastic-coated textiles netting or the like.

For certain purposes however it is also possible to connect together two inelastic sheets or an inelastic sheet and an elastic sheet, such as for instance two aluminum sheets or an aluminum sheet together with a plastic sheet. Since metal foils are not capable of high frequency welding, they can be used in accordance with the subject matter of the application with one of the outer layers only if they are provided with a coating which is capable of ultrasonic welding.

If elastic materials are used as upper and lower layers in the composite materials of the invention, one obtains high elasticity in the direction perpendicular to the strands of material of the intermediate layer since the strands of material which lie perpendicular to the direction of tension scarcely impair the elasticity. If a material of rubber elasticity is not used as material for the intermediate layer, then however the elasticity of the composite material is substantially less in the direction of the strands of the material of the intermediate layer than it is in the direction perpendicular thereto. For this reason, it is preferred that the strands of material of the intermediate layer be subdivided in multiples in the transverse direction. For instance, the subdivisions can be effected every one to three centimeters. In this way, one obtains a composite material which has excellent elasticity in all directions of tension and therefore constitutes an excellent material for articles of clothing such as sports clothing. This is particularly true if the transversely subdivided strands of material consist of foam rods.

The composite materials of the invention can find many uses such as, for instance, sports and work clothing, as insulation against cold, heat and sound, as insulating and floating bodies, as highly elastic, insulating, physiologically functional clothing or parts thereof, for heating blankets of medical instruments, bag and luggage articles, for fashion accessories, for upholstery materials for chairs, automobile interior fittings, baby carriage fittings, motorcycle saddles and the like. Due to their water-tightness, heat-insulating properties and floating properties, these composite materials are particularly well suited as water sports clothing which at the same time constitutes a floating aid. In contradistinction to stitched composite materials, for the present material the surface of the outer layers remains without holes and therefore water-tight.

When used for seat coverings, such as for automobile seats, airplane seats and the like, an open-pore foam is advisedly used for the strands of material and a water-vapor-pervious material at least as an upper layer. Perspiration then passes through the upper layer into the pores of the foam and is pumped from pore to pore through the foam to the lower layer as a result of the movements of the person seated thereon.

The method in accordance with the invention for the manufacture of the composite materials described above consists in the fact that two webs of a material (weldable by ultrasonic welding) which form the upper layer and the lower layer are continuously welded to each other by ultrasonic welding along substantially parallel weld seams which are spaced from each other and that during the welding process between the weld seams the strands of material of the intermediate layer are inserted between the upper layer and the lower layer.

One apparatus for this purpose is of an anvil and an oscillating body for ultrasonic welding and characterized by an anvil in the form of spaced plates and guides for the strands of material of the intermediate layer which extend into the spaces between the anvil plates. The guides for the strands of material of the intermediate layer may be of different development, for instance, developed as channels or preferably as tubes through which endless strands of the material of the intermediate layer, such as, for instance, strands of foam are delivered. When using such an apparatus, one web of material, either the upper layer or the lower layer, is fed to the ultrasonic welding apparatus below the guides for the strands of material and the other web of material is fed to the ultrasonic welding device above the guides for the strands of material. In this way, before welding together the two webs of material, the strands of material of the intermdiate layer lie spaced from and parallel to each other between the webs of material when these strands reach the ultrasonic welding apparatus. The weld spots are then produced by the ultrasonic welding apparatus in the form of parallel lines in the spaces between the strands, as a result of which the so-called "weld seams" are produced between the strands of material of the intermediate layer.

When the oscillating body of the ultrasonic welding apparatus is placed on the anvil, the strands of material for the intermediate layer must be able ordinarily to locate themselves between the anvil plates, so that the apparatus of the invention is advisedly so developed that in the region of the oscillating body there is sufficient space between the anvil plates for the intrusion of the strands of material used in the intermediate layer.

The apparatus of the invention preferably has anvil plates in the form of annular plates fastened, spaced apart from each other, on a common shaft. Annular spacers are also preferably provided between the annular plates. It is particularly suitable if the annular plates are arranged on the shaft in a manner such that their spaced apart distance is adjustable, in order in this way to be able to adapt the apparatus, as desired, to the requirements of the material.

In order to obtain, in accordance with the above description, composite materials having a high elasticity on all sides, the strands of material for the intermediate layer should be divided up in the transverse direction. In certain cases this can be done by feeding the strands of material, already divided into individual pieces, via the guides for the strands of material. Since this, however, is difficult in the case of given materials and can lead to production bottlenecks, with individual pieces placing themselves cross-wise, one particularly preferred further development of the method of the invention consists in using strands of material having a melting point below that of the upper and lower layers and introducing the strands of material as a whole into the channels between the upper and lower layers but, after their insertion, subdividing them in transverse direction by the brief pressing onto the composite material of an instrument of the nature of a punch die, e. g., knife, which is heated to below the melting or softening point of the upper and lower layers but above the melting point of the strands of material.

In this manner, the strands of material which were originally unitary, such as, for instance, those from a plastic foam, can be subdivided (within the completely welded product) from the outside without impairing the outer layers of the composite material.

The heatable punch die, i. e., knife-like device used in this connection, can be a metal sheet of a thickness of 0.5 to 1.0 mm which is closed by means of reciprocating die movements at an adjustable rate, i. e., step-and index, or it may be a correspondingly milled heatable gear-like roller which is pressed rotatingly against the composite material.

In the drawing:

FIG. 1 is a perspective view of a portion of a composite material in accordance with the invention, containing on its left-hand side transversely divided strands of material, but on its right-hand side, alternatively unitary strands of material;

FIG. 2 is a diagrammatic showing of a front view of an apparatus in accordance with the invention; and FIG. 3 is a diagrammatic side view of the apparatus of FIG. 2.

The composite material of the invention shown in FIG. 1 consists of the upper layer 1, the lower layer 2, and the strands of material, for instance, foam rods 3. The upper layer 1 and the lower layer 2 consist of a material which is ultrasonically weldable and these materials are welded together spot-wise by ultrasonic welding along the weld seams 5.

Two embodiments are shown simultaneously in the figure. In the right-hand half of the figure, the strands of material 3 consist of unitary foam rods while in the left-hand part, the inserts consist of individual foam cylinders at least partially separated from each other, located one behind the other and as a whole forming the strands of material. The strands of material can lie, without connection to the upper layer or the lower layer, in the channels formed by said layers, as is always the case when the material of these strands 3 is not weldable by ultrasonics. The strands of material 3 can however also have some connection with the upper layer and lower layer at the weld seams 5 if they themselves consist of a material which is weldable by ultrasonic welding.

In FIGS. 2 and 3 an apparatus for carrying out the method of the invention is shown diagrammatically. As main components, this apparatus has annular disc-shaped anvil plates 6, of high-grade steel, for example, each having two rows of projections 7 which serve for the spot welding at the weld seams 5 (as illustrated in FIG. 1). These anvil plates 6 are fastened to a common shaft 8 and are held firmly in their position by spacers 9 in the form of small steel rings (only one set of spacers is illustrated). The spacers 9 are surrounded by a filling ring 10 which partially fills the space between adjacent anvil plates, but only to such an extent that an annular recess 11 remains in the region of the periphery, into which recess the upper layers, the rod 3, and the lower layer 2 are constrained. During the welding process, the upper layer 1 and the lower layer 2 must lie closely together to the periphery of the anvil plates 6 and to the oscillatory body 12 (manufactured by Branson Sonic Power, Danbury, Kentucky, USA). By replacement of the spacers 9 and the filling rings 10 by ones of larger or smaller dimensions, the spaces between the anvil plates 6 can be adjusted.

Through the feed tubes 13 of a substantially square cross-section, the strands of material 3 are fed as the intermediate layer. Typically, the lower layer 2 is introduced into the gap between the anvil plates 7 and the oscillating body 12, and below the feed tubes 13 and the upper layer 1 is introduced therein above the feed tubes 13. Since the feeding of the upper layer 1 and the lower layer 2 as well as the feeding of the strands of material 3 takes place continuously, the strands of material 3 are in this way incorporated in the composite material simultaneously with the welding process.

At the outlet side of the apparatus, as can be noted from FIG. 3, there is provided a heated punching knife, i.e., die, 14 which at regular time intervals presses against the welded composite material which continuously moves along the abutment 14. The temperature of this knife 14 is so adjusted that the upper layer 1 and the lower layer 2 are not caused to melt, while the interposed strands of material of the intermediate layer are cut through in whole or in part upon contact with the punching knife by melting at the place of contact.

In front of each feed tube 13, there is arranged a knife 16, the cutting edge of which faces in the direction opposite the direction of travel of the strands of material. Thus, a foam sheet can be fed to the apparatus. This sheet is divided by the knives 16 into individual strands which are now fed individually each into one of the feed tubes 13.

The following examples serve further to explain the invention.

EXAMPLE 1

Two webs of a warp knit material having a basis weight of about 150 g/m$^2$ which consist of about 18% Elasthan* and 82% polyamide yarn were welded together on an ultrasonic machine (such as shown in FIG. 2) in logitudinal direction with a spacing of 16 mm and an anvil width of 4 mm. The anvils present below the sonotrodes (oscillating body 12) were in disc shape and mounted rotatably so that a continuous ultrasonic welding was possible of the two weldable warp knit fabrics forming the outer layers of the composite material. Endless strips of a polyurethane foam of polyether with a bulk weight of 30 kg/m$^3$ and a width of 10 mm each were introduced continuously into the parallelly extending hollow spaces produced in longitudinal direction upon the welding.
*Elasthan is a polyurethane fiber.

The composite material produced in this manner had a pronounced profiled structure, was elastic in all directions and showed a good recovery after loading by weight or stretching.

EXAMPLE 2

Two circular knit tricot fabrics of polyamide yarn of a basis weight of about 120 g/m$^2$ were bonded together by ultrasonic welding in the manner indicated in Example 1 with a clear distance between the hollow spaces of 40 mm. Strips of a non-woven wool materially of a basis weight of 100 g/m$^2$ were introduced continuously in a width of 35 mm into the hollow spaces produced during the welding.

The composite material produced in this manner was elastic and furthermore had extremely favorable physiological properties with respect to heat retention and the absorbing and giving off of moisture and could be used in advantageous fashion for sports and work clothing.

EXAMPLE 3

A warp knit fabric coated with elastic polyurethane of a basis weight of 60 g/m$^2$ was welded together, as in Example 1, with a warp knit fabric consisting of 12% Elasthan and 88% polyamide with a weight of about 100 g/m$^2$ in the manner and with the dimensions of Example 1. A polyethylene foam of a bulk weight of 30 kg/m$^3$ in circular profile shape with a diameter of 10 mm was inserted continuously into the hollow spaces during the welding process.

The composite material obtained in this manner had a relief-like, half-round surface structure on both sides. It can be used among other things for protective clothing for athletes, motorcycle drivers, water lifesaving clothing and fashion effects in bag making.

EXAMPLE 4

Two warp knit fabrics of a basis weight of 150 g/m$^2$ each consisting of 18% Elasthan and 82% polyamide were welded as in Example 1 with a spaced apart distance such that there were produced parallel hollow spaces into which foamed polyethylene of a bulk weight of 30 kg/m$^3$ in circular shape of 10 mm diameter was inserted continuously.

This composite material was passed with a pressure of about 1 bar below a roller cut in the manner of gear teeth and heated to about 150° C. The milling was so dimensioned that the teeth had a depth of about 15 mm and a thickness of 0.75 mm at the pressure application place.

The milled roller had a diameter of about 150 mm. The distances between teeth were about 15 mm on the outside and these teeth were adjustably heated from the inside by means of circulated oil.

With a work width of 1200 mm, the apparatus divided the endless intermediate-layer material of foamed polyethylene at a rate of between 5 to 7 m/min into individual cylindrical pieces of a length of about 15 mm.

What is claimed is:

1. As an article of manufacture, a composite material comprising:
    an upper layer;
    a lower layer connected to the upper layer along substantially parallel, spaced apart ultrasonically welded seams; and
    an intermediate layer comprised of individual strands of material which lie substantially parallel to said welded seams and which are not secured to said upper layer and lower layer so as to lie free to move between said seams in respective channels formed by said upper and lower layers and said welded seams wherein said composite material has a high degree of elasticity in the longitudinal direction of said strands.

2. A composite material comprising:
    an upper layer;
    a lower layer secured to the upper layer along substantially parallel, spaced apart, ultrasonically welded seams; and
    an intermediate layer comprised of individual strands of material which are plurally subdivided, at least partially, in the transverse direction thereof and which lie substantially parallel to said welded seams and between said seams in respective channels formed by said upper and lower layers and said welded seams.

3. A composite material according to claim 1, wherein said strands of material are comprised of a material ultrasonically unweldable.

4. A composite material according to claim 1, wherein the strands of material are comprised of a plastic foam.

5. A composite material according to claim 1, wherein the material of at least one of the upper layer and the lower layer is elastic.

6. A composite material according to claim 1, wherein the strands of material of the intermediate layer are comprised of an elastic material.

7. A method of producing a composite material of the type having an upper layer, a lower layer and an intermediate layer comprised of a plurality of elongated strands of material disposed between said upper layer and said lower layer, comprising the steps of:
    ultrasonically welding said upper layer directly to said lower layer along substantially parallel, spaced apart weld seams, and
    continuously feeding said strands of material between the upper layer and the lower layer and between said weld seams during said step of ultrasonically welding so as to continuously form said composite material.

8. A method for producing a composite material wherein two webs of ultrasonically weldable material form an upper layer and a lower layer, comprising the steps of:
    continuously welding together said layers along substantially parallel weld seams spaced apart from each other;
    feeding strands of material forming an intermediate layer between the weld seams during said welding step such that said intermediate layer is inserted between the upper layer and the lower layer so as to continuously form said composite material, wherein said strands of material have one of a melting temperature point and a melting temperature range which is below that of the upper and lower layers; and
    subdividing said strands in the transverse direction thereof in at least a partial cross-section of said strands by a brief pressing against the composite material of a heated die, said die being at a temperature below the respective one of the melting temperature point and melting temperature range of the upper and lower layers and being at a temperature equal to or greater than the respective one of the melting temperature point and melting temperature range of the strands of material to be subdivided.

9. An apparatus for producing a composite material of the type having an upper layer, a lower layer and an intermediate layer comprised of a plurality of elongated strands of material disposed between said upper layer and said lower layer, comprising:
    a plurality of parallel, spaced apart, intermittently engaging anvil plates;
    an oscillating body for ultrasonically welding said upper layer to said lower layer along substantially parallel, spaced apart weld seams, between said anvil plates and said oscillating body; and
    guide means for feeding said strands of material of said intermediate layer between said spaced apart, intermittently engaging anvil plates and said oscillating body and between said weld seams so as to continuously form said composite material.

10. An apparatus according to claim 9, wherein said anvil plates are of a disc-like configuration and are fixedly attached on a common shaft spaced apart from each other.

11. An apparatus according to claim 9, wherein a plurality of said anvil plates are adjustably spaced apart in pairs.

12. An apparatus according to claim 9, wherein said apparatus includes a recess space between said intermittently engaging anvil plates for receiving said strands of material of said intermediate layer when said anvil plates and said oscillating body engagably secure said upper and lower layer during the welding operation.

* * * * *